(12) United States Patent
Scheerer et al.

(10) Patent No.: US 8,666,875 B1
(45) Date of Patent: Mar. 4, 2014

(54) DETERMINATION OF BANDING START PRICE FOR ORDER EVALUATION

(75) Inventors: John Scheerer, Frankfort, IL (US); Randal Almeida, Chicago, IL (US)

(73) Assignee: Chicago Mercantile Exchange, Inc., Chicago, IL (US)

(*) Notice: Subject to any disclaimer, the term of this patent is extended or adjusted under 35 U.S.C. 154(b) by 0 days.

(21) Appl. No.: 13/586,112

(22) Filed: Aug. 15, 2012

(51) Int. Cl.
*G06Q 40/00* (2012.01)

(52) U.S. Cl.
USPC .......................................................... 705/37

(58) Field of Classification Search
USPC .......................................................... 705/37
See application file for complete search history.

(56) References Cited

U.S. PATENT DOCUMENTS

| | | | |
|---|---|---|---|
| 7,835,972 B2 * | 11/2010 | Almeida et al. | 705/37 |
| 7,996,301 B2 * | 8/2011 | Callaway et al. | 705/37 |
| 2005/0203826 A1 * | 9/2005 | Farrell et al. | 705/37 |
| 2007/0118459 A1 * | 5/2007 | Bauerschmidt et al. | 705/37 |
| 2008/0294631 A1 * | 11/2008 | Malhas et al. | 707/5 |
| 2012/0072326 A1 * | 3/2012 | Acuna-Rohter et al. | 705/37 |

FOREIGN PATENT DOCUMENTS

| | | | | |
|---|---|---|---|---|
| CA | 2 799 620 | * | 12/2011 | G06Q 40/00 |
| WO | WO 2005/013041 | * | 2/2005 | G06F 17/16 |

OTHER PUBLICATIONS

CME Group: CME Globex Reference Guide, Sep. 2012, pp. 1-31.*
Kohler, Jeff: Pencil in Profits in any Market with a Calendar Spread, Feb. 10, 2010, Internet Archives, Investopedia, pp. 1-7.*
Donohue, Craig, S.: Statement Before the Joint CFTC-SEC Committee on Emerging Regulatory Issues, Jun. 22, 2010, pp. 1-23.*
Document titled "GCC Price Banding", downloaded on Jun. 29, 2012, from <http://www.cmegroup.com/confluence/display/EPICSANDBOX/GCC+Price+Banding>.

* cited by examiner

*Primary Examiner* — Bijendra K Shrestha
(74) *Attorney, Agent, or Firm* — Banner & Witcoff, Ltd.

(57) ABSTRACT

A banding start price may be generated using one of multiple subroutines. Each of the subroutines may generate a banding start price using a different algorithm and may have different input data criteria. Each of those subroutines may be ranked based expected accuracy of a price output by the subroutine. The banding start price may be generated by the highest ranking subroutine for which there is input data satisfying relevant criteria.

22 Claims, 8 Drawing Sheets

DETERMINATION OF BANDING START PRICE FOR ORDER EVALUATION

BACKGROUND

Futures contracts, options on futures contracts and numerous other types of financial products are traded using exchanges established for such trading. Such trading may involve potential purchasers of a financial product submitting orders known as bids. A bid order may include a bid price representing the value at which a potential buyer is willing to purchase the financial product in question. Similarly, potential sellers of a financial product may submit orders known as offers. An offer order may include an offer (or "ask") price representing the value at which a potential buyer is willing to sell the financial product in question. A bid order may be matched to an offer order so as to execute a trade in the financial product that is the subject of the matched bid and the offer.

So as to avoid wasting computer resources processing orders that are unlikely to be matched, an exchange may use a price band to set a price range for acceptable bids and offers. If an incoming order has an associated bid or ask price within the price band, the order is accepted for further processing (e.g., entry into an order database and evaluation for potential matching against other orders). If an incoming order has an associated bid or ask price that is outside the price band, the order is rejected. A rejected order may, for example, be the result of an input error by the party submitting the order. Such errors are sometimes called "fat finger" errors.

A price band is typically established by first determining a banding start price (BSP). The price band is then set as a certain range of values above and below the BSP. For example, a price band for crude oil futures contracts may be set at 75 ticks above and below a BSP. As known in the art, a "tick" may represent the minimum price fluctuation permitted by an exchange during a trading session. At any point in time, an incoming order for a crude oil futures contract is compared to a +/−75 tick price band centered on the current BSP. If the order has an associated bid or ask price within that price band, it is accepted for further processing. If the order has an associated bid or ask price outside that price band, the order is rejected.

It is desirable for a BSP to accurately reflect a current market value for the financial product in question. In at least some current methods, a default value for a BSP is the most recent settlement price for the financial product in question. As is also known in the art, a "settlement price" for a futures contract and for other types of financial products may be an official closing price for the product set by an exchange at the close of a daily settlement cycle for a daily trading period. That settlement price may not reflect an accurate value of the financial product, however, particularly if there has been significant trading in that product since determination of that settlement price. Accordingly, if there is recent trading data available for a financial product, current methods will use such data to calculate the BSP.

Existing methods for BSP determination can determine a fair value for BSP in liquid markets. When prices are stale and a market for a particular financial product is illiquid, however, existing methods may result in a BSP which is a less accurate indicator of fair market value.

SUMMARY

This Summary is provided to introduce a selection of concepts in a simplified form that are further described below in the Detailed Description. This Summary is not intended to identify key or essential features of the invention.

In at least some embodiments, a banding start price may be generated using one of multiple subroutines. Each of the subroutines may generate a banding start price using a different algorithm and may have different input data criteria. Each of those subroutines may be ranked based expected accuracy of a price output by the subroutine. The banding start price may be generated by the highest ranking subroutine for which there is input data satisfying relevant criteria.

Embodiments include, without limitation, methods for generating a banding start price, computer systems configured to perform such methods, and computer-readable media storing instructions that, when executed, cause a computer system to perform such methods.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Various embodiments may comprise a method, a computer system, and/or a computer program product. Accordingly, one or more aspects of one or more of such embodiments may take the form of an entirely hardware embodiment, an entirely software embodiment and/or an embodiment combining software and hardware aspects. Furthermore, such aspects may take the form of a computer program product stored by one or more non-transitory computer-readable storage media having computer-readable program code, or instructions, embodied in or on the storage media. The term "computer-readable medium" or "computer-readable storage medium" as used herein includes not only a single medium or single type of medium, but also a combination of one or more media and/or types of media. Such a non-transitory computer-readable medium may store computer-readable instructions (e.g., software) and/or computer-readable data (i.e., information that may or may not be executable). Any suitable computer readable media may be utilized, including various types of non-transitory computer readable storage media such as hard disks, CD-ROMs, optical storage devices, magnetic storage devices, and/or any combination thereof. The term "computer-readable medium" or "computer-readable storage medium" could also include an integrated circuit or other device having hard-coded instructions (e.g., logic gates) that configure the device to perform one or more operations.

Aspects of method steps described in connection with one or more embodiments may be executed on one or more processors associated with a computer system (such as exchange computer system 100 and/or other computers described below). As used herein, a "computer system" could be a single computer or could comprise multiple computers. When a computer system comprising multiple computers performs a method, various steps could be performed by different ones of those multiple computers. Processors of a computer system may execute computer-executable instructions stored on non-transitory computer-readable media. Embodiments may also be practiced in a computer system forming a distributed computing environment, with tasks performed by remote processing devices that are linked through a communications network. In a distributed computing environment, program modules may be located in both local and remote computer storage media including memory storage devices.

Exemplary Operating Environment

Figure 1:
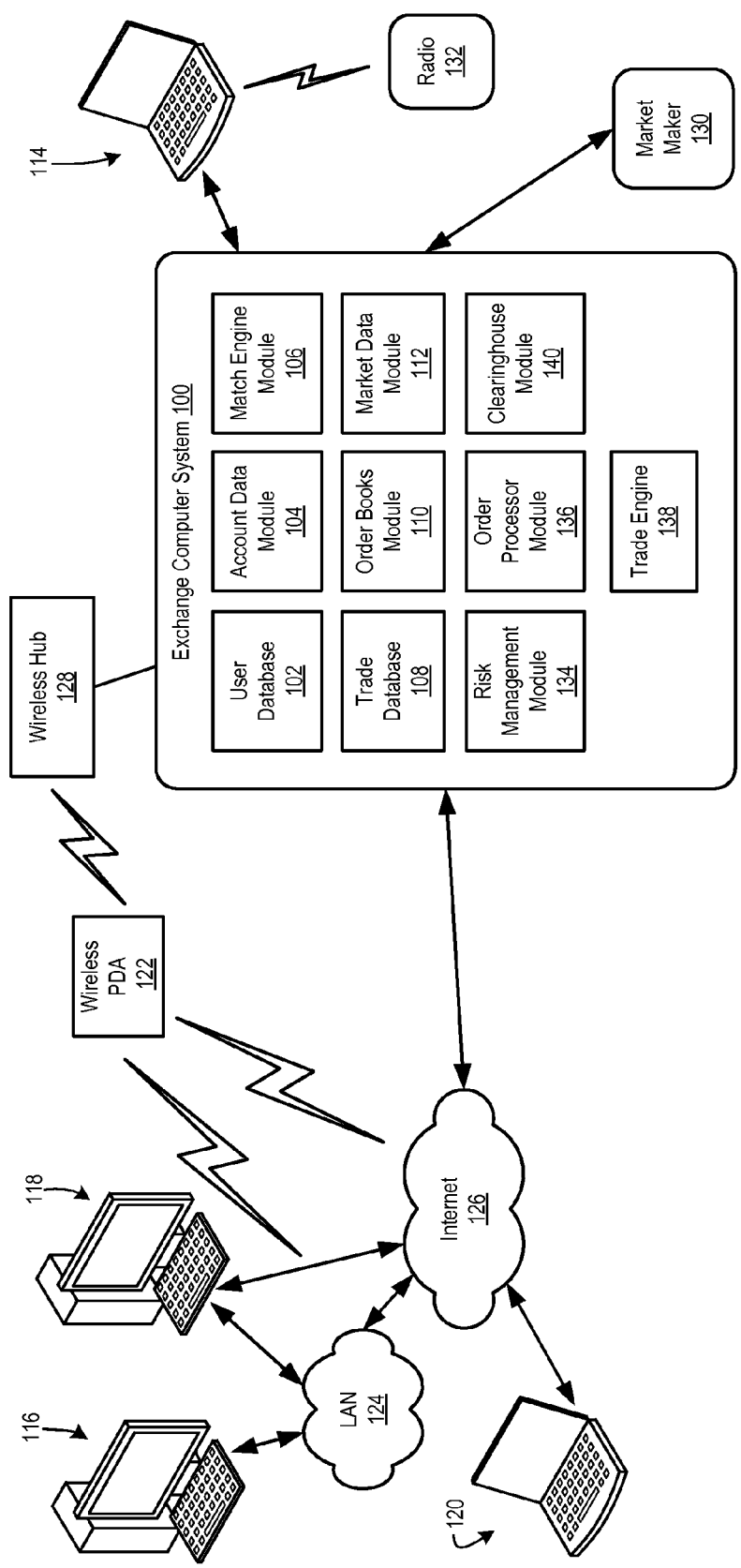
FIG. 1 shows an exemplary trading network environment for implementing trading systems and methods according to at least some embodiments.

Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods that generate a banding start price (BSP) and utilize that generated BSP in ways described more fully below.

Computer system 100 can be operated by a financial product exchange and configured to perform operations of the exchange for, e.g., trading in various financial products. Financial products of the exchange may include, without limitation, futures contracts, options on futures contracts ("futures contract options"), and other types of derivative contracts. Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses a 64-bit processor. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers. As explained in more detail below, match engine module 106 may also generate a BSP, use that BSP to determine a price band, and use that price band to reject incoming orders or forward incoming orders for further processing.

A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options and other derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 140 may be included as part of exchange computer system 100 and configured to carry out clearinghouse operations. Module 140 may receive data from trade database 108 regarding trades of futures contracts and other financial products and facilitate the financial product exchange acting as one of the parties to every traded contract or other product. For example, computer system 100 may match an offer by party A to sell an exchange-traded financial product with a bid by party B to purchase a like exchange-traded financial product. Module 140 may then create an exchange-traded financial product between party A and the exchange and an offsetting second exchange-traded financial product between the exchange and party B. Module 140 may also be configured to perform other clearinghouse operations. As another example, module 140 may maintain margin accounts for clearing members. In those accounts, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc.

Each of modules 102 through 140 could be separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-140).

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics, radio links or other media.

A wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet. Computers 116, 118 and 120 may communicate with each other via the Internet 126 and/or LAN 124.

One or more market makers 130 may maintain a market by providing constant bid and offer prices for a derivative or security to exchange computer system 100. Exchange computer system 100 may also include trade engine 138. Trade engine 138 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on non-transitory computer-readable media. For example, computer device 116 may include computer-executable instructions for receiving market data from exchange computer system 100 and displaying that information to a user. As another example, match engine module 106 may include computer-executable instructions for generating a BSP using a process such as is described below, using that BSP to generate a price band, and using that price band to determine whether reject incoming orders or forward incoming orders for further processing.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

In at least some embodiments, exchange computer system 100 (or "system 100") generates a banding start price (BSP) for each of multiple types of financial products. As explained in more detail below, system 100 may generate a BSP by using one of multiple pricing subroutines. Each of those subroutines may be ranked based expected accuracy of a price output by the subroutine. System 100 may complete the highest ranking subroutine for which there is input data satisfying relevant criteria.

System 100 utilizes a generated BSP to locate a price band for the financial product type to which the BSP relates. When system 100 subsequently receives an order for a financial product of that financial product type, a price associated with that order is compared to the price band. If the received order price is within the band, the order is accepted for further processing. If the received order is outside the band, the order is rejected.

Financial product types for which various embodiments can be employed include, without limitation, futures contracts, futures contracts options, swaps, over the counter (OTC) contracts, and other types of derivatives. Solely for purposes of convenience, the following description uses futures contract types as non-limiting examples of financial product types for which various embodiments could be advantageously used. The applicability of the herein described methods, systems and other embodiments to other financial product types will be apparent to persons of ordinary skill in view of the description herein.

As is known in the art, futures contracts are contracts that are traded on a financial products exchange and that have standardized terms defined by the exchange. Each futures contract has an underlying subject matter on which valuation of the futures contract is based. The subject matter of a futures contract is also known as the "underlying" for the contract. Examples of an underlying for a futures contract can include, without limitation, a commodity (e.g., an agricultural, energy, metal or other commodity), a government issued-security (e.g., a United States Treasury Bill or Note), a non-government security (e.g., a bond or stock issued by a corporation), a currency, a market index, etc. Financial products other than futures contracts also have an underlying. For example, the underlying for a futures contract option may be the futures contract to which the option relates.

Each futures contract represents an obligation to make "delivery," on a contractually-specified future date, with regard the underlying. Some futures contracts may require "physical" delivery, i.e., delivery of a contractually-specified quantity of the underlying. Other futures contracts may require delivery by payment of a cash value based on a contractually-specified quantity of the underlying.

As indicated above, futures contracts may be bought and sold through an exchange. A buyer of a futures contract, also known as "long" or a "long counterparty," agrees to pay a contract price in return for taking delivery on the contractually-specified delivery date. A seller of a futures contract, also known as a "short" or a "short counterparty," conversely agrees to receive payment of the contract price in return for making delivery on the contractually-specified delivery date. A party wishing to buy a futures contract submits an order called a "bid." That bid includes an associated bid price at which the potential buyer wishes to buy the futures contract in question. A party wishing to sell a futures contract submits an order called an "offer." That offer includes an associated "ask" price for which the potential seller wishes to sell the futures contract in question. A trade for a futures contract can be executed when an offer and a bid are matched.

As used herein, a "financial product type" (or "product type") refers to a category of financial products that share common characteristics. A "financial product" (or "product") refers to an individual instance of a financial product type. For example, a financial product type for a category of futures contracts (i.e., a futures contract type) may be all futures contracts for a specific underlying and having the same delivery date. As further and more specific examples, a "December Y crude" futures contract type may be a category of futures contracts for delivery of a specified quantity of crude oil on a contractually specified date in December of year Y. A December Y crude futures contract is an individual contract of the December Y crude futures contract type. A "December Y+1 crude" futures contract type may be a category of futures contracts for delivery of a specified quantity of crude oil on a contractually specified date in December of year Y+1. A December Y+1 crude futures contract is an individual contract of the December Y+1 crude futures contract type. The December Y crude futures contract type and the December Y+1 crude futures contract type may have the same underlying, e.g., the same specific quantity of the same type of crude oil to be physically delivered at the same terminal. Because of the different delivery dates, however, a December Y crude futures contract may have a different economic value than a December Y+1 crude futures contract, and thus categorization of December Y crude futures contracts and December Y+1 crude futures contracts as different futures contract types is appropriate.

Figure 2A:
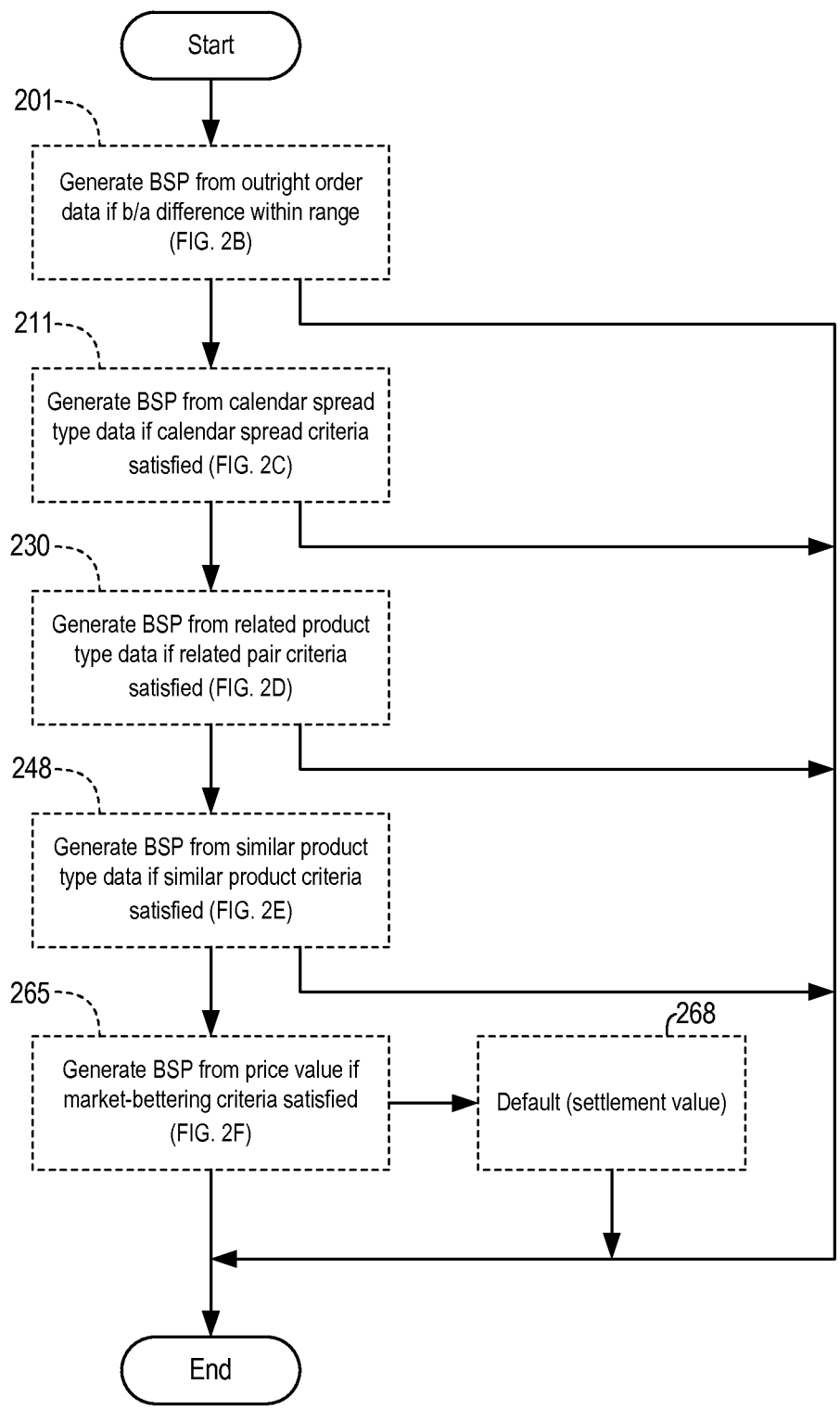
FIGS. 2A through 2F are flow charts showing operations in a process performed by an exchange computer system, in at least some embodiments, to generate a banding start price.

FIG. 2A is a summary flow chart showing operations in a process 200 performed by exchange computer system 100, in at least some embodiments, to generate a BSP. FIGS. 2B through 2F are a more detailed flow chart showing additional features of process 200. System 100 may perform process 200 separately for each of numerous financial product types. In the following description of process 200, "subject financial product type" (or "subject product type") refers to the product type with respect to which process 200 is being performed and for which a BSP is sought. Similarly, "subject financial products" (or "subject products") are actual products (e.g., actual futures contracts) of the subject product type. In some embodiments, the operations of process 200 may be performed by match engine module 106 (FIG. 1). In other embodiments, the operations of process 200 might be performed by a different module of system 100. In yet other embodiments, the operations of process 200 might be distributed across multiple modules of system 100.

Process 200 includes multiple different pricing subroutines. Each of those subroutines generates a BSP using a different algorithm and requires input data meeting criteria applicable to that subroutine. Moreover, each of those subroutines is ranked based on how closely a price output by the subroutine is expected to indicate a fair market value for the subject financial product type. As system 100 performs process 200, it begins with the highest ranking subroutine and determines if there is input data satisfying the input data criteria for that subroutine. If so, a BSP is generated using that subroutine. If not, system 100 proceeds through one or more lower ranked subroutines and generates a BSP in a subroutine for which there is input data satisfying the relevant input data criteria.

After starting process 200, system 100 initially reaches highest ranking subroutine 201. The input data criteria for subroutine 201 require that a difference between recent bid and ask prices for outright trading of subject financial products be within a predefined range. If those input data criteria are satisfied, a BSP is generated based on that bid/ask difference. If those input data criteria are not satisfied, subroutine 201 terminates without generating a BSP. Additional details of subroutine 201 are described in connection with FIG. 2B.

Subroutine 211 commences if subroutine 201 terminates without generating a BSP. In subroutine 211, if a calendar spread type meeting calendar spread criteria can be identified, a BSP is generated from data associated with that calendar spread type. Otherwise, subroutine 211 terminates without generating a BSP. Additional details of subroutine 211 are described in connection with FIG. 2C.

Subroutine 230 commences if subroutine 211 terminates without generating a BSP. In subroutine 230, if a related product type pair type meeting related pair criteria can be identified, a BSP is generated from data associated with that related product pair. Otherwise, subroutine 230 terminates without generating a BSP. Additional details of subroutine 230 are described in connection with FIG. 2D.

Subroutine 248 commences if subroutine 230 terminates without generating a BSP. In subroutine 248, if a similar product type meeting similar product criteria can be identified, a BSP is generated from data associated with that similar product type. Otherwise, subroutine 248 terminates without generating a BSP. Additional details of subroutine 248 are described in connection with FIG. 2E.

Subroutine 265 commences if subroutine 248 terminates without generating a BSP. In subroutine 265, if there is a price meeting market-bettering criteria, that price is assigned as the BSP. Otherwise, subroutine 265 terminates without generating a BSP. Additional details of subroutine 265 are described in connection with FIG. 2F. If subroutine 265 terminates without generating a BSP, a recent settlement value is assigned as the BSP in step/subroutine 268.

Figure 2B:
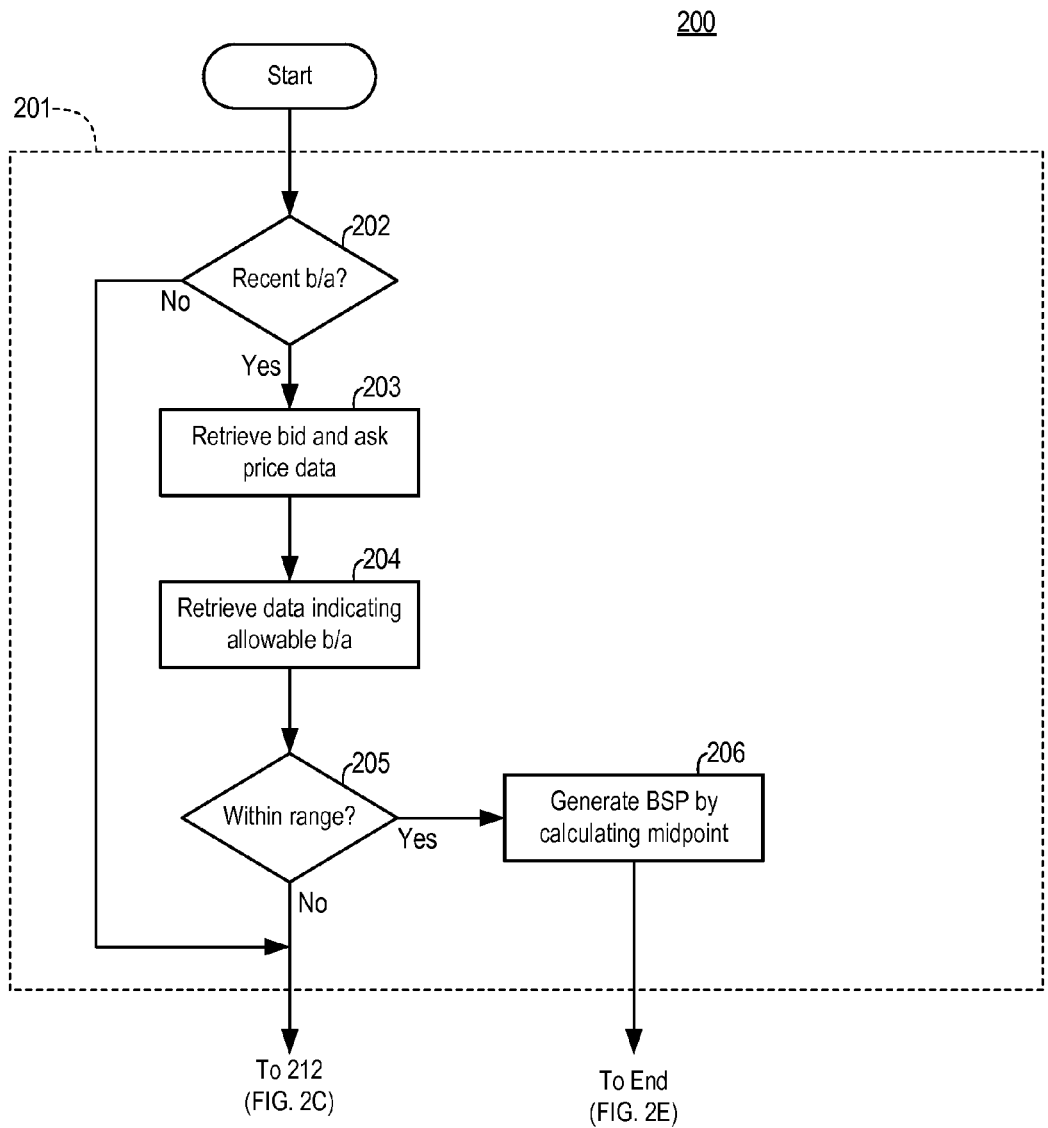

Turning to FIG. 2B, subroutine 201 commences with step 202. System 100 determines in step 202 if there is at least one recent unrejected bid and at least one recent unrejected offer for subject products. For example, if the subject product type is the December Y crude futures contract type, system 100 would determine if there is at least one recent unrejected bid for a December Y crude futures contract and at least one recent unrejected offer for a December Y crude futures contract. In at least some embodiments, an order is "unrejected" if it was not rejected because of being outside of the price band associated with a previously generated BSP for the subject product type. Similarly, an order may be considered recent if it has been received during the current trading day (e.g., since the last settlement). A current trading day may be the trading day that coincides with the day on which process 200 is being performed. The current trading day may also be the trading day during which orders for subject products may be accepted or rejected using a price band associated with a BSP being generated in the current performance of process 200. System 100 may determine the existence of a recent bid and offer, and any associated prices, by consulting a database within system 100 (e.g., a database associated with order books module 110 and/or a database associated with market data module 112).

Figure 2C:
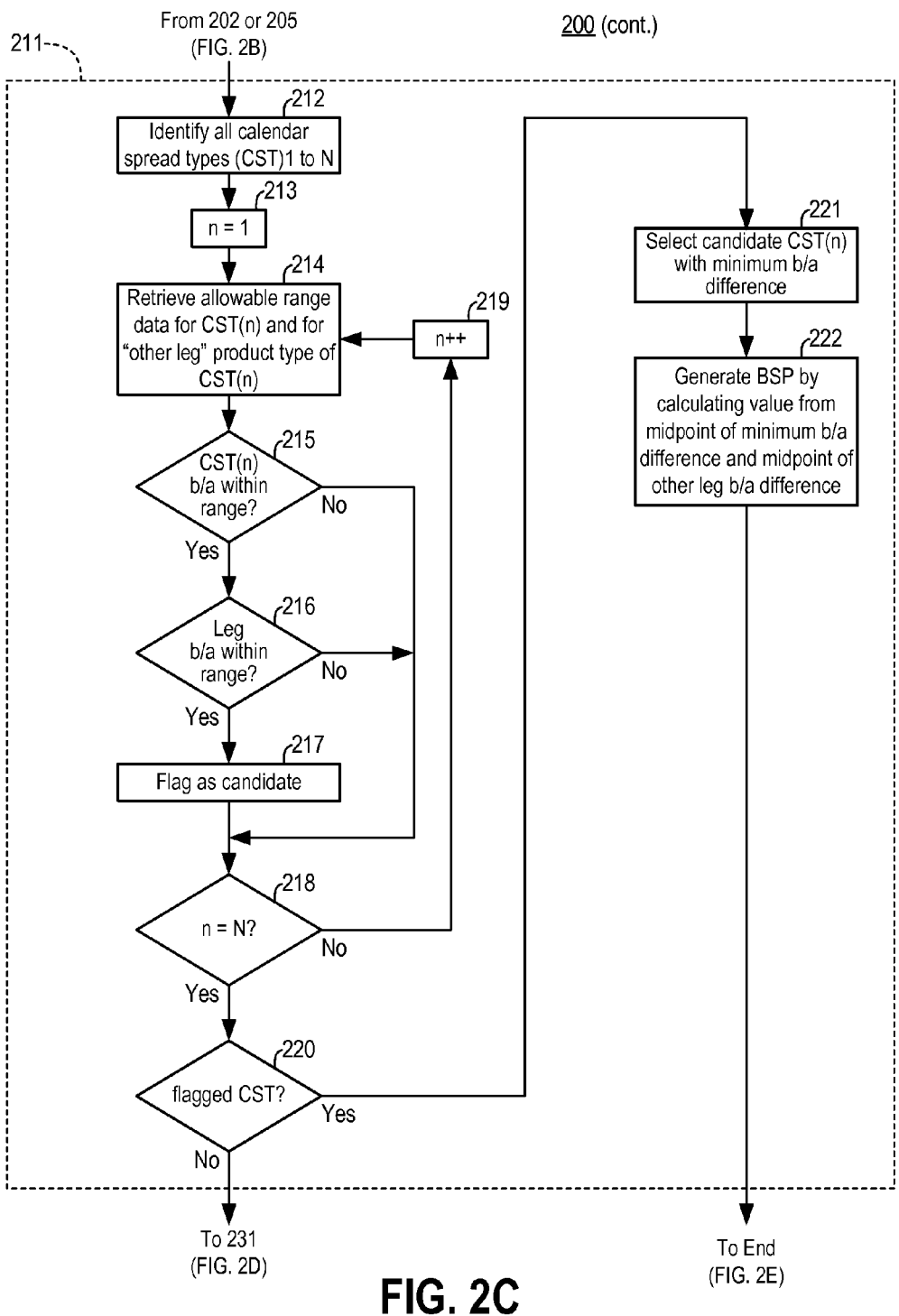
Figure 2D:
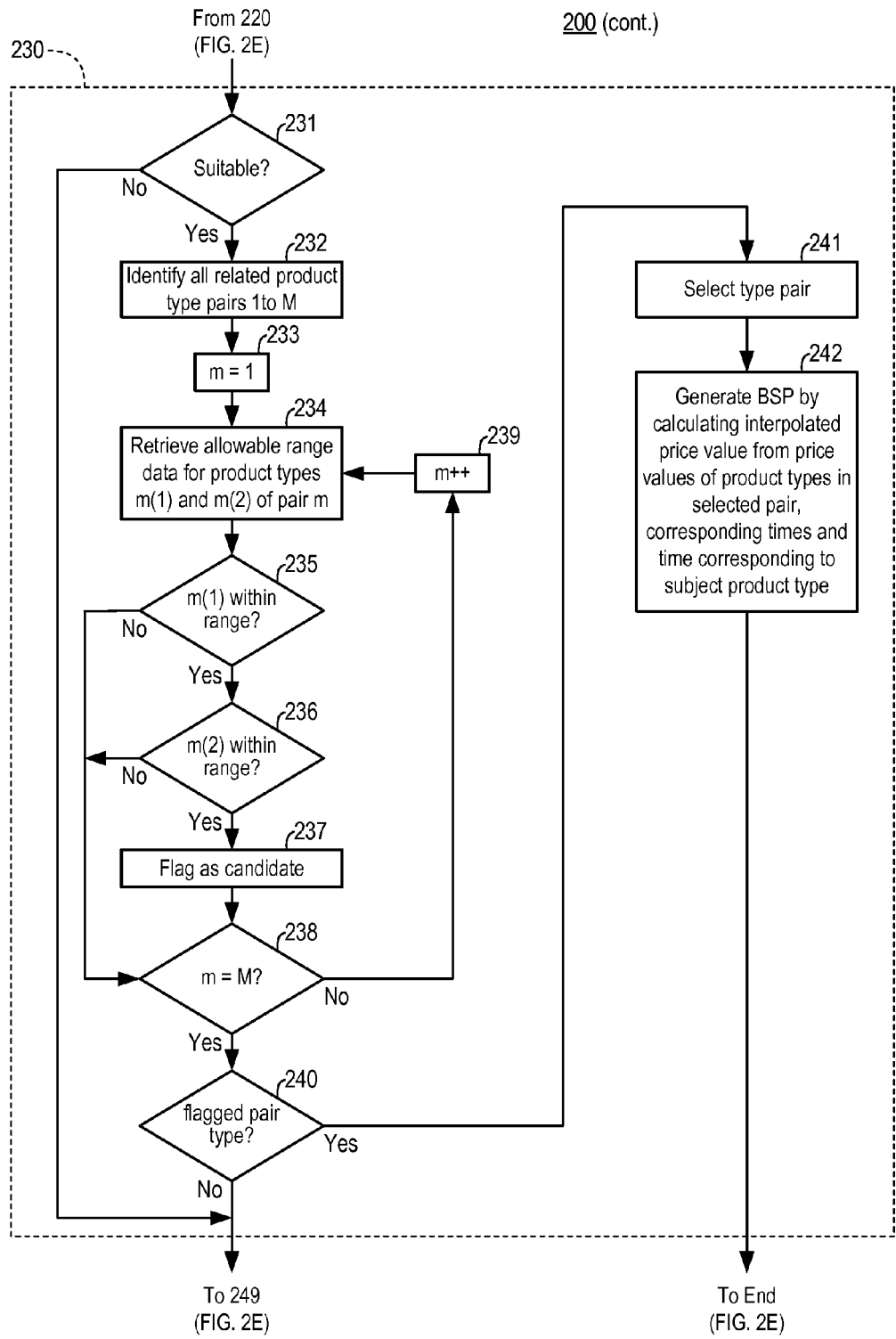
Figure 2E:
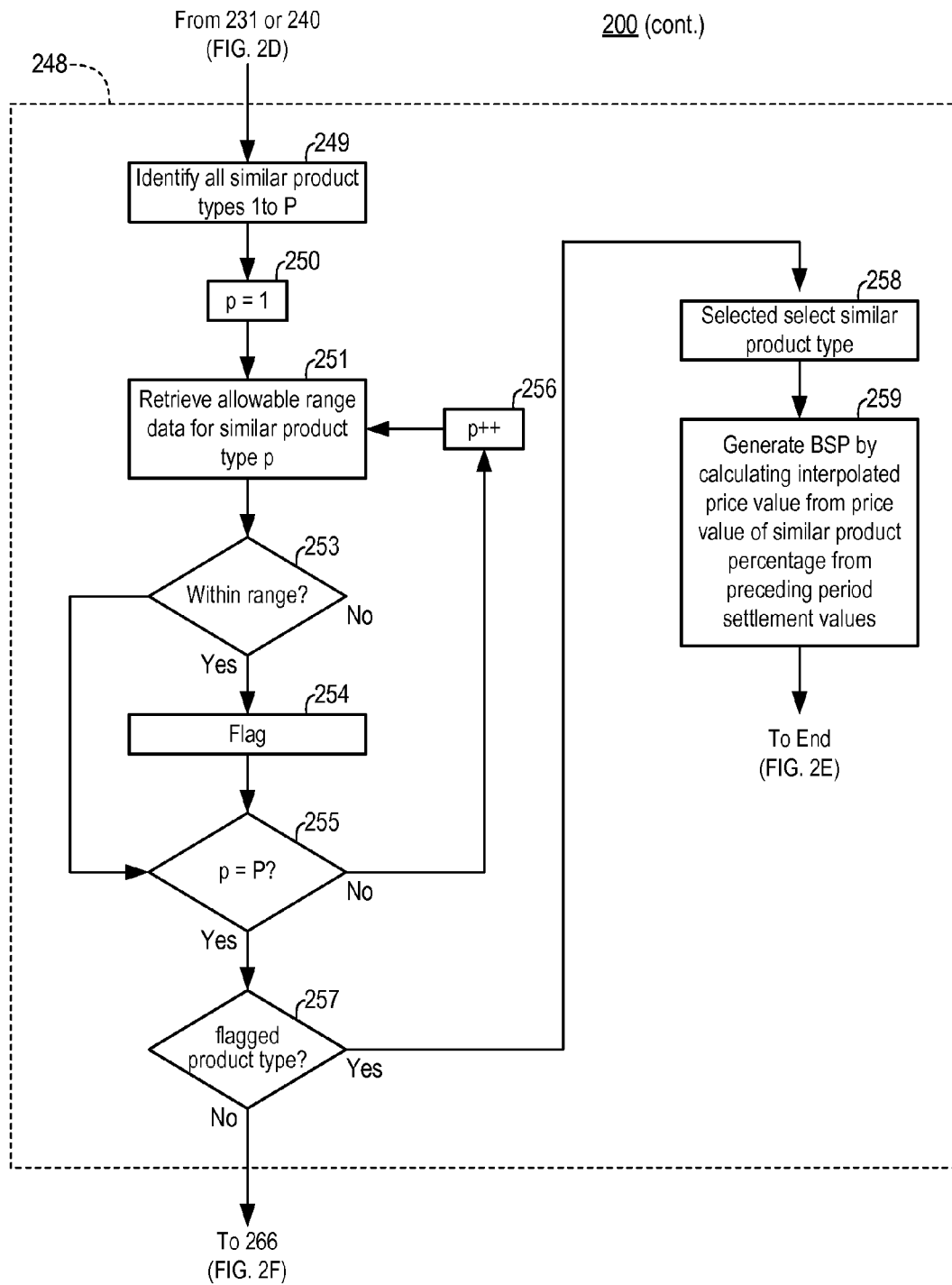
Figure 2F:
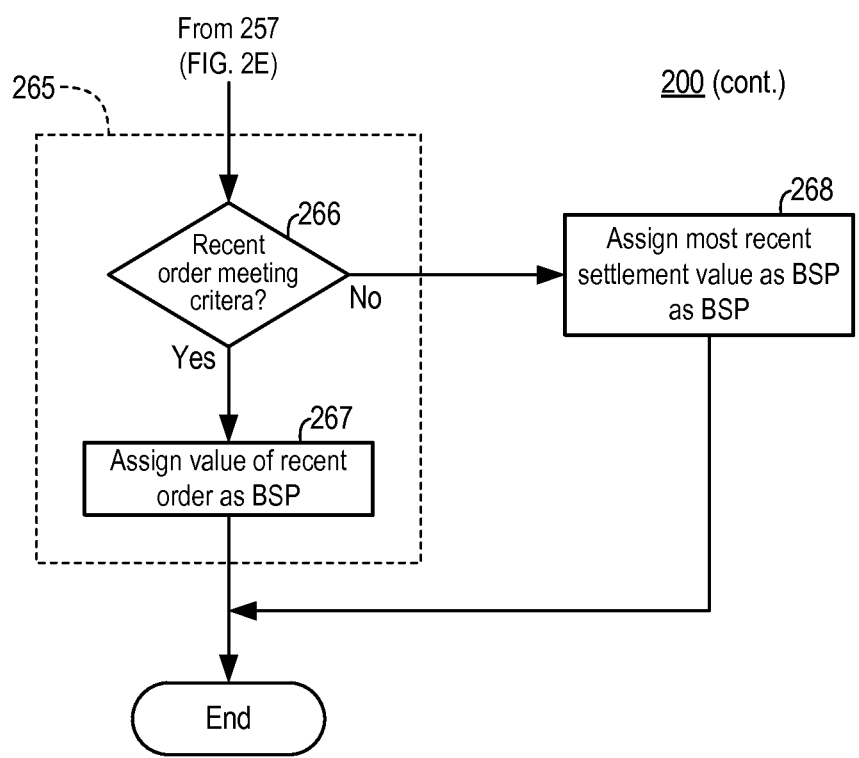

If there is not at least one recent unrejected bid for a subject product and at least one recent unrejected offer for a subject product, subroutine 201 ends and process 200 continues on the "no" branch from step 202 to step 212 (FIG. 2C). If there is at least one recent bid and at least one recent offer, subroutine 201 does not end and process 200 continues to step 203 on the "yes" branch from step 202. In step 203, computer system 100 retrieves the bid price associated with the most recent subject product bid and the ask price associated with the most recent subject product offer. Process 200 then continues to step 204, where system 100 retrieves data indicating an allowable range between bid and ask prices for the subject product type.

In at least some embodiments, allowable bid/ask ranges may be separately determined for each of multiple product types. Each of those ranges may then be stored in a database and accessed by system 100 when performing process 200. In addition to bid/ask range data for the subject product type, allowable bid/ask range data for other product types may be used in connection with subsequent subroutines of process 200. In some embodiments, an allowable bid/ask range for a particular product type may be determined from analysis of historical trading data for that product type. For example, historical trading data could be analyzed to calculate an average bid/ask difference. That average could then be used as the allowable range.

After retrieving the allowable range data in step 204, process 200 continues to step 205. In step 205, system 100 determines if the difference between the bid and ask prices retrieved in step 203 is within the range indicated by the data retrieved in step 204. If so, process 200 continues to step 206 on the "yes" branch from step 205. In step 206, system 100 generates a BSP for the subject product type by calculating a midpoint between the bid and ask prices retrieved in step 203. The midpoint could be, e.g., the average of those bid and ask prices. From step 206, process 200 ends.

If in step 205 system 100 determines that the difference between the most recent bid and ask prices is not within the allowable range, subroutine 201 terminates without proceeding to step 206. Instead, process 200 continues on the "no" branch from step 205 to block 212 (FIG. 2C) and begins subroutine 211.

In subroutine 211, process 200 determines if there is a calendar spread type meeting certain input data criteria. If so, data associated with that calendar spread type may be used to generate a BSP. As known in the art, a "calendar spread" is the simultaneous purchase and sale of two products that respectively correspond to different dates. For example, a calendar spread may involve the purchase of a first product having a particular underlying and corresponding to a first date and the sale of a second product having the same underlying but corresponding to a second date. The first date could be before or after the second date. In the case of a futures contract, a corresponding date may be a delivery date. The constituent products of a calendar spread (or the constituent product types of a calendar spread type) are known as "legs." The product in a calendar spread having the earlier corresponding date is known as the front leg. The product in a calendar spread having the later corresponding date is known as the back (or deferred) leg.

In subroutine 211, process 200 examines calendar spread types in which the subject product type forms one of the legs of the calendar spread type, and in which the other leg is formed by a different product type that has the same underlying as the subject product type. As used herein, a "calendar spread type" refers to a category of calendar spreads. A "calendar spread" is an individual calendar spread of that category. All calendar spreads of a particular calendar spread type have a front leg formed by the same type of position (i.e., either long or short) in a first product of the same first product type and a back leg formed by the same type of position (i.e., short if the front leg is long, long if the front leg is short) in a second product of the same second product type.

Process 200 may examine calendar spread types in which the subject product type is bought as the front leg, calendar spread types in which the subject product type is sold as the front leg, calendar spread types in which the subject product type is bought as the back leg and calendar spread types in which the subject product type is sold as the back leg. Continuing the previous example, assume that the subject product type is the December Y crude futures contract type. Process 200 may examine a first calendar spread type defined as a front leg long position in the December Y crude futures contract type and a back leg short position in the a December Y+1 crude futures contract type. Every first calendar spread in the first calendar spread type would include a purchased December Y crude futures contract as the front leg and a sold December Y+1 crude futures contract as the back leg. Process 200 may further examine a second calendar spread type defined as a front leg short position in the December Y crude futures contract type and a back leg long position in the a December Y+1 crude futures contract type (with every second calendar spread thus including a sold December Y crude futures contract as the front leg and a purchased December Y+1 crude futures contract as the back leg), a third calendar spread type defined as a front leg long position in the December Y−1 crude futures contract type and a back leg short position in the December Y crude futures contract type, a fourth calendar spread type defined as a front leg short position in the December Y−1 crude futures contract type and a back leg long position in the December Y crude futures contract type, etc.

In step 212 of subroutine 211, system 100 identifies all unmatured calendar spread types (CST) 1 through N in which one of the legs is a position in the subject product type. A calendar spread type or other financial product type may be considered "unmatured" if a delivery date or other corresponding date has not yet passed and if the last trading day for that spread or product type has not passed. The letter "N" represents an arbitrary number for purposes of the present example. The actual value of N will depend, e.g., on the number of product types having the same underlying as the subject product type. Process 200 then continues to step 213, where system 100 initializes a loop counter "n" to a value of 1. Next, system 100 retrieves data in step 214 indicating an allowable range of bid/ask price differences for calendar spread type n.

In some embodiments, an exchange may allow a party wishing to purchase a calendar spread (i.e., buying the front leg and selling the back leg) to submit an order bidding a value representing the front leg minus the back leg. Similarly, a party wishing to sell a calendar spread (i.e., selling the front leg and buying the back leg) may submit an order asking a value representing the front leg minus the back leg. As with allowable bid/ask ranges for outright trading discussed in connection with subroutine 201, allowable bid/ask ranges may be separately determined for each of multiple calendar spread types that include a particular product type as one of the legs. Each of those ranges may then be stored in a database and accessed by system 100 when performing process 200. An allowable bid/ask range for a given calendar spread type may be determined from analysis of historical trading data for that calendar spread type.

Also in step 214, system 100 retrieves data indicating the allowable bid/ask range for the "other leg" product type of calendar spread type n. In particular, system 100 retrieves data indicating the allowable bid/ask range for outright trading in instances of the product type forming the leg of calendar spread type n other than the leg formed by the subject product type. For convenience, the leg of a calendar spread formed by a product type other than a subject financial product type will be generically referred to herein as the "other leg" product type. If the subject product type is the December Y crude futures contract type and calendar spread type n is the "first calendar spread type" described above, then the data retrieved in step 214 would include data indicating an allowable range of bid/ask price differences for the first calendar spread type, as well as data indicating the allowable bid/ask range for outright trading of the December Y+1 crude futures contract type.

After retrieving data in step 214, process 200 continues to step 215. System 100 then determines if there is a recent unrejected offer and a recent unrejected bid for a calendar spread of type n during the current trading day (or other recent period), as well whether a difference between a most recent bid for a calendar spread of type n and a most recent offer for a calendar spread of type n is within the allowable range. If not, or if there is not a bid and an offer for such a calendar spread in a recent period, process 200 continues on the "no" branch to step 218 (described below). System 100 may determine the existence of a recent bid and offer for calendar spreads of a particular type, and any associated prices, by consulting a database within system 100 (e.g., a database associated with order books module 110 and/or a database associated with market data module 112).

If system 100 determines in step 215 that there is a recent unrejected bid and a recent unrejected offer for a type n calendar spread and that the difference between the prices associated with that bid and offer is within the allowable range, process 200 continues to step 216 on the "yes" branch. In step 216, system 100 determines if there is a recent unrejected offer and a recent unrejected bid for outright trading of an other leg product during the current trading day (or other recent period), as well whether a difference between a most recent bid price and a most recent ask price for outright trading of the other leg product is within the allowable range. If not, or if there is not a bid and an offer for an other leg product in a recent period (e.g., the current trading day), process 200 continues on the "no" branch to step 218. Otherwise, process 200 continues to step 217 on the "yes" branch from step 216.

In step 217, system 100 flags calendar spread type n as a candidate for use in BSP generation. As part of that flagging, system 100 may store data indicating the most recent bid for a calendar spread of type n and the most recent offer for a calendar spread of type n (retrieved in step 215), data indicating the difference between that most recent bid and most recent offer (calculated in step 215), data indicating the most recent bid and the most recent offer for outright trading of the other leg product type (retrieved in step 216) and data indicating the difference between that most recent other leg bid and other leg offer (calculated in step 216).

Process 200 then continues to step 218, where system 100 determines if there are other calendar spread types identified in step 212 that remain to be evaluated as candidates for use in BSP generation. If all of the identified calendar spread types have not been evaluated (i.e., if counter n is not equal to N), then process 200 continues on the no branch to step 219. Counter n is incremented by 1 in step 219, after which process 200 returns to step 214. If in step 218 system 100 determines that all identified calendar spread types have been evaluated (i.e., if n=N), process 200 continues on the "yes" branch from step 218 to step 220.

In step 220, system 100 determines if any of the identified calendar spread types were flagged as candidates for use in BSP generation. If so, process 200 continues to step 221 on the "yes" branch. In step 221, processor 200 selects the candidate calendar spread type for which there is the smallest difference between calendar spread bid and ask prices. This difference would have been calculated during a performance of step 215 for the selected calendar spread type and stored during a performance of step 217 for the selected calendar spread type. In step 222, system 100 then generates a BSP by calculating a value for the subject product type based on the data associated with the calendar spread type selected in step 221. In particular, system 100 first determines a value for the selected calendar spread type by taking a midpoint of the most recent bid and ask prices for calendar spreads of the selected type, which bid and ask prices were stored during performance of step 217. System 100 next determines a value for the "other leg" product type of the selected calendar spread type by taking a midpoint of the most recent bid and ask prices for outright trading of other leg products, which bid and ask prices were also stored during performance of step 217. If the subject product type is the front leg of the selected calendar spread type, its value (and thus the BSP) is calculated by adding the value for the selected calendar spread type to the value for the "other leg" product type. If the subject product type is the back leg of the selected calendar spread type, its value (and thus the BSP) is calculated by subtracting the value for the selected calendar spread type from the value for the "other leg" product type. From step 222, process 200 ends.

If in step 220 system 100 determines that none of the identified calendar spread types were flagged as candidates for use in BSP generation, subroutine 211 terminates without proceeding to step 221. Instead, process 200 continues on the "no" branch from step 205 to block 231 (FIG. 2D) and begins subroutine 230.

In subroutine 230, system 100 determines if there is a pair of related product types satisfying certain input data criteria. In particular, system 100 determines if there are first and second related product types such that: (i) each of those related product types has the same underlying as the subject product type, (ii) one of those related product types corresponds to a date prior to a subject date corresponding to the subject product type, (iii) the other of those related product types corresponds to a date after the subject date, (iv) there is acceptable price data available for both the first and second related product types. If a pair of related product types satisfying the these criteria can be found, data associated with that pair may be used to generate a BSP.

In step 231, system 100 first determines if the subject product type is one for which subroutine 230 should be used. Certain product types may be ill-suited for BSP generation using subroutine 230. For example, there may be an underlying for which an exchange defines futures contract types having delivery dates well into the future. However, futures contracts for that particular underlying may be "front month centric" and have little trading activity for contracts with delivery dates after the earliest few delivery dates. Conversely, there may be active trading in futures contracts for some types of underlying (e.g., many agricultural commodities) having delivery dates well into the future. In some embodiments, an exchange operating system 100 may prepare one or more lists of product types that are not suited for BSP generation using subroutine 230, and/or one or more lists of product types that are suited for BSP generation using subroutine 230. These lists can be stored in a database and accessed by system 100 in step 231.

If system 100 determines in step 231 that the subject product type is classified as not suitable for BSP determination using subroutine 230, subroutine 230 terminates and process 200 continues to step 249 (FIG. 2E) on the "no" branch from step 231. If system 100 determines in step 231 that the subject product type is classified as suitable for subroutine 230, subroutine 230 and process 200 continue to step 232.

In step 232, system 100 identifies all related unmatured product type pairs 1 through M in which one member of the pair (m(1)) has the same underlying as the subject product type but corresponds to a date prior to a subject date that corresponds to the subject product type, and in which the other member of the pair (m(2)) has the same underlying as the subject product type but corresponds to a date after to the subject date. The letter "M" represents an arbitrary number for purposes of the present example. The actual value of M will depend on the number of product types having the same underlying as the subject product type. As one example of a related product pair, assume that the subject product type is the previously described December Y crude futures contract type. One related product pair could include the June Y crude futures contract type (m(1)) and the December Y+1 crude futures contract type (m(2)).

Process 200 then continues to step 233, where system 100 initializes a loop counter "m" to a value of 1. Next, system 100 retrieves data in step 234 indicating an allowable range of bid/ask price difference for the first member m(1) of pair m, as well as data indicating an allowable range of bid/ask price difference for the second member m(2) of pair m.

In step 235, system 100 determines if there is a recent unrejected offer and a recent unrejected bid for a product of type m(1) during the current trading day (or other recent period). If so, system 100 further determines in step 235 whether a difference between a most recent unrejected bid price and a most recent unrejected ask price for a product of type m(1) is within the allowable range. If all of these criteria are satisfied, i.e., if a difference between a most recent unrejected m(1) bid price and a most recent unrejected m(1) ask price is within the allowable range, process 200 continues to step 236 on the "yes" branch. Otherwise, process 200 goes directly to step 238 (described below) in the "no" branch.

If process 200 continues to step 236, system 236 determines if there is a recent unrejected offer and a recent unrejected bid for a product of type m(2) during the current trading day (or other recent period). If so, system 100 further determines in step 236 whether a difference between a most recent unrejected bid price and a most recent unrejected ask price for a product of type m(2) is within the allowable range. If all of these criteria are satisfied, process 200 goes directly to step 237 on the "yes" branch. Otherwise, process 200 continues to step 238 on the "no" branch. If process 200 continues to step 237, system 100 flags product type m as a candidate for use in BSP generation. As part of that flagging, system 100 may store data indicating the most recent m(1) bid price, the most recent m(1) ask price, the most recent m(2) bid price and the most recent m(2) ask price.

From step 237, process 200 continues to step 238. System 100 determines in step 238 if there are product type pairs identified in step 232 that remain to be evaluated as candidates for use in BSP generation. If all of the identified product type pairs have not been evaluated (i.e., if counter m is not equal to M), then process 200 continues on the no branch to step 239. Counter m is incremented by 1 in step 239, after which process 200 returns to step 234. If in step 238 system 100 determines that all identified product type pairs have been evaluated (i.e., if m=M), process 200 continues on the "yes" branch from step 238 to step 240.

In step 240, system 100 determines if any of the identified product type pairs were flagged as candidates for use in BSP generation. If so, process 200 continues to step 241 on the "yes" branch. In step 241, processor 200 selects one of the candidate product type pairs. In some embodiments, system 200 selects the candidate product type pair for which the pair members have the shortest temporal separation (i.e., the smallest difference between) corresponding dates. For example, assume a first candidate type pair with members having corresponding dates in June of year Y and June of year Y+1 (temporal separation of 12 months), and a second candidate type pair with members having corresponding dates in September of year Y−1 and June of year Y+1 (temporal separation of 21 months). If these were the only two candidate type pairs, system 100 would choose the first pair over the second pair. Conceivably, multiple candidate pairs could have the same temporal separation. Continuing the previous example, assume a subject date corresponding to the subject product type is December of year Y, and further assume a third candidate type pair having members with respective delivery dates of March of year Y and March of year Y+1. In this scenario, the first and third candidate type pairs both have a temporal separation of 12 months. In such a circumstance, system 100 in some embodiments selects the candidate type pair having a member with a corresponding date closest to the subject date. In the current example, system 100 would select the third candidate pair over the first candidate pair, as the difference between December of year Y and March of year Y+1 (3 months) is less than a difference between June of year Y and December of year Y of a difference between December of year Y and June of year Y+1 (6 months). If two candidate type pairs have the same temporal separation and each has a member that is as temporally close to the subject date as a member of the other pair (e.g., assume a fourth type pair having corresponding dates in September of year Y and September of year Y+1), system 100 could select the candidate pair having a front month closest to the subject date (e.g., the fourth pair in the current example).

The foregoing discussion of step 241 merely represents some embodiments. In other embodiments, other techniques can be used to select from multiple candidate pairs.

In step 242, system 100 generates a BSP by calculating a value for the subject product type based interpolation between price values for the members of the selected type pair. In particular, system 100 first determines a value for the front member of the selected type pair by taking a midpoint of the most recent bid and ask prices associated with that member, which bid and ask prices were stored during performance of step 237. System 100 next determines a value for the back member of the selected type pair by taking a midpoint of the most recent bid and ask prices associated with that member, which bid and ask prices were also stored during performance of step 237. System 100 then calculates the BSP according to the following formula:

$$P_s = BSP = P_1 - [((T_1 - T_S)*(P_1 - P_2))/(T_1 - T_2)], \text{ where}$$

$P_s$=price value for subject product type,
$P_1$=price value for front member product type of selected pair,
$P_2$=price value for back member product type of selected pair,
$T_1$=time corresponding to front member product type of selected pair,
$T_2$=time corresponding to back member product type of selected pair, and
$T_S$=subject time corresponding to subject product type.

From step 242, process 200 ends.

If in step 240 system 100 determines that none of the identified product type pairs were flagged as candidates for use in BSP generation, subroutine 230 terminates without proceeding to step 241. Instead, process 200 continues on the "no" branch from step 240 to block 249 (FIG. 2E) and begins subroutine 248.

In subroutine 248, system 100 determines if there is a similar product type satisfying certain input data criteria. In particular, system 100 determines if there is a similar product type such that: (i) the similar product has the same underlying as the subject product type, (ii) the similar product type has a corresponding date prior to or after the subject date corresponding to the subject product type, and (iii) there is acceptable price data available for similar product type during a current period. If a similar product type satisfying these criteria can be found, data associated with similar product type may be used to generate a BSP.

In step 249, system 100 identifies all unmatured similar product types 1 through P that have the same underlying as the subject product type but that correspond to a date other than the subject date corresponding to the subject product type. The letter "P" represents an arbitrary number for purposes of the present example. The actual value of P will depend on the number of product types having the same underlying as the subject product type. Continuing an earlier example, assume that the subject product type is the previously described December Y crude futures contract type. One similar product type would be the December Y−1 crude futures contract type. Another would be the December Y+1 crude futures contract type.

Process 200 then continues to step 250, where system 100 initializes a loop counter "p" to a value of 1. Next, system 100 retrieves data in step 251 indicating an allowable range of bid/ask price difference for similar product type p. System 100 determines in step 253 if there is a recent unrejected offer and a recent unrejected bid for a product of type p during the current trading day (or other recent period), and if so, whether a difference between a most recent unrejected bid price and a most recent unrejected ask price for a product of type p is within the allowable range. If these criteria are satisfied, process 200 continues to step 254 on the "yes" branch. Otherwise, process 200 goes directly to step 255 (described below) in the "no" branch.

If process 200 continues to step 254, system 100 flags similar product type p as a candidate for use in BSP generation. As part of that flagging, system 100 may store data indicating the most recent unrejected bid and unrejected ask prices for a product of type p. From step 254, process 200 continues to step 255. System 100 determines in step 255 if there are similar product types identified in step 249 that remain to be evaluated as candidates for use in BSP generation. If all of the identified similar product types have not been evaluated (i.e., if counter p is not equal to P), then process 200 continues on the "no" branch to step 256. Counter p is incremented by 1 in step 256, after which process 200 returns to step 251. If in step 255 system 100 determines that all identified similar product types have been evaluated (i.e., if p=P), process 200 continues on the "yes" branch from step 255 to step 257.

In step 257, system 100 determines if any of the identified similar product types were flagged as candidates for use in BSP generation. If so, process 200 continues to step 258 on the "yes" branch. In step 258, processor 200 selects one of the candidate similar product types. In some embodiments, system 200 selects the candidate similar product type having a corresponding date closest to the subject date corresponding to the subject product type (and in the event of a tie, the corresponding date closest to and preceding the subject date). In other embodiments, other algorithms may be used to select candidate similar product type.

In step 259, system 100 generates a BSP by calculating a current price value for the subject product type based on a current price value of the selected similar product type and most recent settlement values for the subject product type and the selected similar product type. In particular, system 100 first determines a current price value CPV(sim) for the selected similar product type by taking a midpoint of the most recent bid and ask prices associated with that selected product type, which bid and ask prices were stored during performance of step 254. System 100 then calculates a settlement percentage SP by dividing a recent settlement value for the subject product type by a recent settlement value for the selected similar product type determined on the same day as the recent settlement value for the subject product type. The settlement values for the subject and similar product types may be settlement values for each of those types from the trading period preceding the current period. The current price value for the subject product type, and BSP, is then calculated by multiplying SP and CPV(sim). From step 259, process 200 ends.

If in step 257 system 100 determines that none of the identified similar product types were flagged as candidates for use in BSP generation, subroutine 200 terminates without proceeding to step 258. Instead, process 200 continues on the "no" branch from step 257 to block 266 (FIG. 2F) and begins subroutine 265.

In subroutine 265, system 100 determines if there at least one unrejected order for products of the subject product type that meets certain criteria. Specifically, system 100 determines if there is a current unrejected order that "betters the market." In some embodiments, an order is current if it has been received since determination of the last settlement value for the subject product type. If there has only been a single order since determination of the last settlement value, that order will be considered to better the market if it has an associated bid price higher than the last settlement value or an associated ask price lower than the last settlement value. If there are have been multiple orders since determination of the last settlement value, an order will be considered to have bettered the market if: (i) it has an associated bid price higher than the price associated with the last market-bettering order, (ii) it has an associated bid price higher than the last settlement if none of the other recent orders bettered the market, (iii) it has an associated ask price lower than the price associated with the last market-bettering order, or (iv) it has an associated ask price lower than the last settlement if none of the other recent orders bettered the market. If an order satisfying these criteria can be found, its associated price is used as the BSP.

In step 266, system 100 determines if there are any orders for the subject product during the current trading period that better the market. If not, subroutine 265 ends and process 200 continues to step 268 (discussed below) on the "no" branch. If yes, process 200 continues to step 267 on the "yes" branch. In step 267, system 100 assigns the price associated with a market-bettering current order as the BSP. After step 267, process 200 ends.

If system 100 determines in step 266 that there are not any market-bettering orders in the current trading period, subroutine 265 ends and process 200 continues to step 268 on the no branch. In step 268, which is also the default BSP-generating subroutine in process 200, system 100 assigns the last settlement value for the subject product type as the BSP. After step 268, process 200 ends.

In some embodiments, system 100 may perform process 200 repeatedly for each of multiple product types throughout a trading day or other period. In some embodiments, system 100 may perform process 200 at fixed intervals (e.g., every 15 minutes, every hour, etc.). In some other embodiments, system 200 may perform process 200 at fixed intervals, but the size of the interval may depend on the last subroutine used to generate a BSP. For example, if a BSP is generated in subroutine 201 during a performance of process 200 (i.e., subroutine 201 does not end in step 202 or step 205), that may indicate a relatively liquid market in which prices for subject products may vary more quickly. Accordingly, step 206 in such embodiments may set a time to the next performance of process 200 to a relatively low value. Conversely, a BSP generated in subroutine/step 268 during a performance of process 200 may indicate a relatively illiquid market in which prices for subject products may not vary at all. Accordingly, step 268 in such embodiments may set a time to the next performance of process 200 to a relatively large value.

Process 200 merely represents some embodiments. Other embodiments include processes that include modified versions of one or more steps in process 200, processes that include different steps, processes that omit one or more subroutines or individual steps of process 200, and/or processes that include steps in addition to those of process 200.

Figure 3:
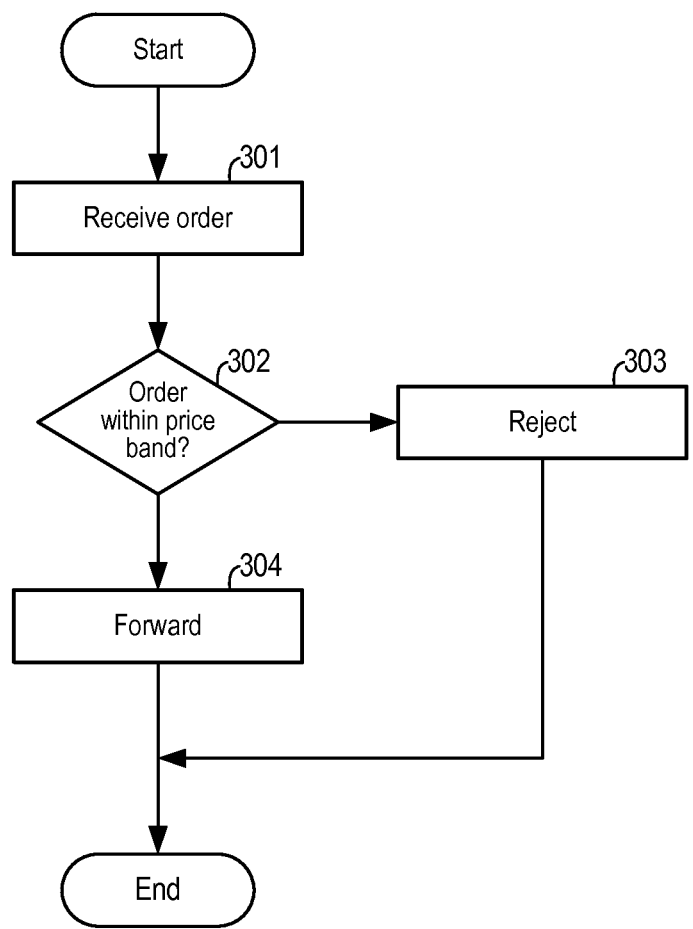
FIG. 3 is a flow chart showing operations performed in connection with a banding start price generated from the process of FIGS. 2A-2F.

FIG. 3 is a flow chart showing operations performed by system 100 in connection with a BSP generated from process 200. In some embodiments, the operations of FIG. 3 may be performed by match engine module 106 (FIG. 1). In other embodiments, the operations of FIG. 3 might be performed by a different module of system 100. In yet other embodiments, the operations of FIG. 3 might be distributed across multiple modules of system 100.

In step 301, system 100 receives an order for a financial product of a particular financial product type. Such an order might be received, e.g., from one of computers 116, 118 or 120 in FIG. 1. In step 302, system 100 retrieves data indicating a price band associated with the most recent BSP generated for that particular financial product type during a performance of process 200. As part of step 302, system 100 also determines if a price associated with the received order is within that price band. In some embodiments, a price band may be j ticks for the particular financial product type above and below the BSP, resulting in a price band 2*j ticks in width centered on the BSP. However, a price band need not be centered on a BSP. For example, in some embodiments a price band may extend j ticks below the BSP and k ticks above the BSP, where j is not equal to k, resulting in a price band of j+k ticks in width.

If system 100 determines in step 302 that a price (whether bid or ask) associated with the received order is within the price band associated with the most recent BSP, system 100 proceeds to step 304 on the "yes" branch and forwards the order for further processing. The further processing may include entering the order into a database for potential matching with other orders. From step 304, the operations of FIG. 3 end. If system 100 determines in step 302 that the received order price is not within the price band, system 100 proceeds to step 303. In step 303, system 100 rejects the received order by not forwarding that order for further processing. As part of step 303, system 100 might also generate and transmit an order rejection message to the party from whom the order was received. From step 303, the operations of FIG. 3 end. The operations of FIG. 3 may then be repeated for additional orders for financial products of a particular financial product type as such orders are received.

CONCLUSION

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. For example, one of ordinary skill in the art will appreciate that some steps illustrated in the illustrative figures may be performed in other than the recited order, and that one or more steps illustrated may be optional in one or more embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. One or more non-transitory computer-readable media storing computer executable instructions that, when executed, cause a computer system to perform operations that include:
 determining if a difference between bid and ask prices for subject financial products of a subject financial product type is within a predefined range;
 if the determined difference is within the predefined range, generating a banding start price for the subject financial product type by calculating a midpoint value of the difference;
 if the determined difference is not within the predefined range, determining if there is a calendar spread type satisfying calendar spread criteria, wherein the calendar spread criteria require that a calendar spread type satisfying the criteria include the subject financial product type as one leg;
 if there is a calendar spread type satisfying the calendar spread criteria, generating a banding start price for the subject financial product type by calculating a value for the subject financial product type based on
  a difference between bid and ask prices for calendar spreads of the satisfying calendar spread type, and
  a price value of a different financial product type forming an other leg of the satisfying calendar spread type;
 receiving orders for subject financial products of the subject financial product type;
 for each of the received orders, determining if a bid or ask price associated with the order is within a predefined range associated with the banding start price;
 rejecting orders having associated bid or ask prices that are not within the predefined range associated with the banding start price; and
 forwarding orders having associated bid or ask prices that are within the predefined range associated with the banding start price for further processing.

2. The one or more non-transitory computer-readable media of claim 1, wherein the stored instructions further comprise instructions that, when executed, cause the computer system to perform operations that include:
 if there is no calendar spread type satisfying the calendar spread criteria, determining if there is a related product type pair satisfying related pair criteria, and wherein the related pair criteria require a related product type pair satisfying the related pair criteria to include
  a first financial product type having an underlying that is the same as a subject underlying of the subject financial product type and corresponding to a first time preceding a subject time corresponding to the subject financial product type, and
  a second financial product type having an underlying that is the same as the subject underlying and corresponding to a second time following the subject time; and
 if there is a related product type pair satisfying the related pair criteria, generating a banding start price of the subject financial product type by calculating a price value for the subject financial product type based on the subject time and based on the following for the satisfying related product type pair: a first price value for the first financial product type, a second price value for the second financial product type, the first time and the second time.

3. The one or more non-transitory computer-readable media of claim 2, wherein the stored instructions further comprise instructions that, when executed, cause the computer system to perform operations that include:
 if there is no related product type pair satisfying the related pair criteria, determining if there is a similar financial product type satisfying similar product criteria, wherein the similar product criteria require a similar product type satisfying the similar product criteria to
  have an underlying that is the same as the subject underlying, and
  have pricing data associated with a current period; and
 if there is a similar financial product type satisfying the similar product criteria, generating a banding start price of the subject financial product type by calculating a value for the subject financial product type based on a current price value of the satisfying similar financial product type and settlement prices for the satisfying similar financial product type and the subject financial product type during a period preceding the current period.

4. The one or more non-transitory computer-readable media of claim 3, wherein the stored instructions further comprise instructions that, when executed, cause the computer system to perform operations that include:

if there is no similar financial product type satisfying the similar product criteria, determining if there is a price value for the subject financial product type satisfying market-bettering criteria; and if there is a price value for the subject financial product type satisfying market-bettering criteria, assigning that price value as a banding start price for the subject financial product type.

5. The one or more non-transitory computer-readable media of claim 4, wherein the market-bettering criteria require that a price value satisfying market-bettering criteria be associated with an order for a subject financial product received subsequent to determination of a most recent settlement value for the subject financial product type and reflect at least one of a bid price higher than the most recent settlement value, an ask price lower than the most recent settlement, a bid price higher than another price previously satisfying the market-bettering criteria, and an ask price lower than another price previously satisfying the market-bettering criteria.

6. The one or more non-transitory computer-readable media of claim 4, wherein the stored instructions further comprise instructions that, when executed, cause the computer system to perform operations that include:

if there is no price value for the subject financial product type satisfying market-bettering criteria, assigning the most recent settlement value for the subject financial product type as a banding start price for the subject financial product type.

7. The one or more non-transitory computer-readable media of claim 1, wherein the calendar spread criteria further require that a calendar spread bid/ask difference be within a predefined range, the calendar spread bid/ask difference representing a difference between bid and ask prices for calendar spreads of a calendar spread type satisfying the calendar spread criteria, and an other leg bid/ask difference be within a predefined range, the other leg bid/ask difference representing a difference between bid and ask prices for different financial products of a different financial product type of a calendar spread type satisfying the calendar spread criteria.

8. The one or more non-transitory computer-readable media of claim 7, wherein determining if there is a calendar spread type satisfying calendar spread criteria comprises identifying multiple calendar spread types satisfying the calendar spread criteria, each of the multiple calendar spread types having a corresponding calendar spread bid/ask difference, determining if there is a calendar spread type satisfying calendar spread criteria further comprises determining which of the multiple calendar spread types has the smallest corresponding calendar spread bid/ask difference, determining if there is a calendar spread type satisfying calendar spread criteria further comprises designating the calendar spread type having the smallest corresponding calendar spread bid/ask difference, and calculating a value for the subject financial product type comprises calculating a value for the subject financial product type based on the calendar spread bid/ask difference for the designated calendar spread type and a price value of the different financial product type forming an other leg of the designated calendar spread type.

9. The one or more non-transitory computer-readable media of claim 2, wherein the related pair criteria further require that a first bid/ask difference be within a predefined range, the first bid/ask difference representing a difference between bid and ask prices for first financial products of a first financial product type of a related product pair satisfying the related pair criteria, and a second bid/ask difference be within a predefined range, the second bid/ask difference representing a difference between bid and ask prices for second financial products of a second financial product type of a related product pair satisfying the related pair criteria.

10. The one or more non-transitory computer-readable media of claim 3, wherein the similar product criteria further require that the current period pricing data associated with the similar financial product type satisfying the similar product criteria represent a difference between bid and ask prices for similar financial products of that similar financial product type and be within a predefined range.

11. The one or more non-transitory computer-readable media of claim 1, wherein the subject financial product type comprises a type of futures contract or a type of futures option contract.

12. A computer system comprising:

at least one processor; and at least one non-transitory memory, wherein the at least one non-transitory memory stores instructions that, when executed, cause the computer system to perform operations that include determining if a difference between bid and ask prices for subject financial products of a subject financial product type is within a predefined range, if the determined difference is within the predefined range, generating a banding start price for the subject financial product type by calculating a midpoint value of the difference, if the determined difference is not within the predefined range, determining if there is a calendar spread type satisfying calendar spread criteria, wherein the calendar spread criteria require that a calendar spread type satisfying the criteria include the subject financial product type as one leg, if there is a calendar spread type satisfying the calendar spread criteria, generating a banding start price for the subject financial product type by calculating a value for the subject financial product type based on a difference between bid and ask prices for calendar spreads of the satisfying calendar spread type, and a price value of a different financial product type forming an other leg of the satisfying calendar spread type, receiving orders for subject financial products of the subject financial product type, for each of the received orders, determining if a bid or ask price associated with the order is within a predefined range associated with the banding start price, rejecting orders having associated bid or ask prices that are not within the predefined range associated with the banding start price, and forwarding orders having associated bid or ask prices that are within the predefined range associated with the banding start price for further processing.

13. The computer system of claim 12, wherein the stored instructions further comprise instructions that, when executed, cause the computer system to perform operations that include:
   if there is no calendar spread type satisfying the calendar spread criteria, determining if there is a related product type pair satisfying related pair criteria, and wherein the related pair criteria require a related product type pair satisfying the related pair criteria to include
   a first financial product type having an underlying that is the same as a subject underlying of the subject financial product type and corresponding to a first time preceding a subject time corresponding to the subject financial product type, and
   a second financial product type having an underlying that is the same as the subject underlying and corresponding to a second time following the subject time, and
   if there is a related product type pair satisfying the related pair criteria, generating a banding start price of the subject financial product type by calculating a price value for the subject financial product type based on the subject time and based on the following for the satisfying related product type pair: a first price value for the first financial product type, a second price value for the second financial product type, the first time and the second time.

14. The computer system of claim 13, wherein the stored instructions further comprise instructions that, when executed, cause the computer system to perform operations that include:
   if there is no related product type pair satisfying the related pair criteria, determining if there is a similar financial product type satisfying similar product criteria, wherein the similar product criteria require a similar product type satisfying the similar product criteria to
   have an underlying that is the same as the subject underlying, and
   have pricing data associated with a current period, and
   if there is a similar financial product type satisfying the similar product criteria, generating a banding start price of the subject financial product type by calculating a value for the subject financial product type based on a current price value of the satisfying similar financial product type and settlement prices for the satisfying similar financial product type and the subject financial product type during a period preceding the current period.

15. The computer system of claim 14, wherein the stored instructions further comprise instructions that, when executed, cause the computer system to perform operations that include:
   if there is no similar financial product type satisfying the similar product criteria, determining if there is a price value for the subject financial product type satisfying market-bettering criteria, and
   if there is a price value for the subject financial product type satisfying market-bettering criteria, assigning that price value as a banding start price for the subject financial product type.

16. The computer system of claim 15, wherein the market-bettering criteria require that a price value satisfying market-bettering criteria be associated with an order for a subject financial product received subsequent to determination of a most recent settlement value for the subject financial product type and reflect at least one of
   a bid price higher than the most recent settlement value,
   an ask price lower than the most recent settlement,
   a bid price higher than another price previously satisfying the market-bettering criteria, and
   an ask price lower than another price previously satisfying the market-bettering criteria.

17. The computer system of claim 15, wherein the stored instructions further comprise instructions that, when executed, cause the computer system to perform operations that include:
   if there is no price value for the subject financial product type satisfying market-bettering criteria, assigning the most recent settlement value for the subject financial product type as a banding start price for the subject financial product type.

18. The computer system of claim 12, wherein the calendar spread criteria further require that
   a calendar spread bid/ask difference be within a predefined range, the calendar spread bid/ask difference representing a difference between bid and ask prices for calendar spreads of a calendar spread type satisfying the calendar spread criteria, and
   an other leg bid/ask difference be within a predefined range, the other leg bid/ask difference representing a difference between bid and ask prices for different financial products of a different financial product type of a calendar spread type satisfying the calendar spread criteria.

19. The computer system of claim 18, wherein
   determining if there is a calendar spread type satisfying calendar spread criteria comprises identifying multiple calendar spread types satisfying the calendar spread criteria, each of the multiple calendar spread types having a corresponding calendar spread bid/ask difference,
   determining if there is a calendar spread type satisfying calendar spread criteria further comprises determining which of the multiple calendar spread types has the smallest corresponding calendar spread bid/ask difference,
   determining if there is a calendar spread type satisfying calendar spread criteria further comprises designating the calendar spread type having the smallest corresponding calendar spread bid/ask difference, and
   calculating a value for the subject financial product type comprises calculating a value for the subject financial product type based on the calendar spread bid/ask difference for the designated calendar spread type and a price value of the different financial product type forming an other leg of the designated calendar spread type.

20. The computer system of claim 13, wherein the related pair criteria further require that
   a first bid/ask difference be within a predefined range, the first bid/ask difference representing a difference between bid and ask prices for first financial products of a first financial product type of a related product pair satisfying the related pair criteria, and
   a second bid/ask difference be within a predefined range, the second bid/ask difference representing a difference between bid and ask prices for second financial products of a second financial product type of a related product pair satisfying the related pair criteria.

21. The computer system of claim 14, wherein the similar product criteria further require that the current period pricing data associated with the similar financial product type satisfying the similar product criteria represent a difference between bid and ask prices for similar financial products of that similar financial product type and be within a predefined range.

22. The computer system of claim 12, wherein the subject financial product type comprises a type of futures contract or a type of futures option contract.

\* \* \* \* \*